United States Patent
Murphy

(10) Patent No.: US 8,414,236 B2
(45) Date of Patent: Apr. 9, 2013

(54) ADJUSTABLE CARGO SECURING SYSTEM

(76) Inventor: Dave Murphy, Delevan, NY (US)

( * ) Notice: Subject to any disclaimer, the term of this patent is extended or adjusted under 35 U.S.C. 154(b) by 0 days.

(21) Appl. No.: 12/713,830

(22) Filed: Feb. 26, 2010

(65) Prior Publication Data

US 2010/0215456 A1 Aug. 26, 2010

Related U.S. Application Data

(60) Provisional application No. 61/155,645, filed on Feb. 26, 2009.

(51) Int. Cl.
*B60P 7/08* (2006.01)
(52) U.S. Cl. ......... 410/104; 410/105; 410/106; 410/116
(58) Field of Classification Search .................. 410/104, 410/105, 106, 110, 116; 24/115 K, 265 CD; 248/499
See application file for complete search history.

(56) References Cited

U.S. PATENT DOCUMENTS

| | | | |
|---|---|---|---|
| 4,248,558 A | 2/1981 | Lechner | |
| 4,826,193 A * | 5/1989 | Davis | |
| 4,850,769 A * | 7/1989 | Matthews | 410/105 |
| 4,969,784 A | 11/1990 | Yanke | |
| 5,259,711 A | 11/1993 | Beck | |
| 5,409,335 A | 4/1995 | Beck | |
| 6,644,901 B2 | 11/2003 | Breckel | |
| 6,712,568 B2 | 3/2004 | Snyder et al. | |
| 6,846,140 B2 | 1/2005 | Anderson et al. | |
| 7,097,401 B2 | 8/2006 | Haspel | |
| 7,175,377 B2 | 2/2007 | Womack et al. | |
| 7,281,889 B2 | 10/2007 | Anderson et al. | |
| 7,556,463 B1 * | 7/2009 | Hall | 410/104 |

* cited by examiner

*Primary Examiner* — Stephen Gordon
(74) *Attorney, Agent, or Firm* — Hodgson Russ LLP

(57) ABSTRACT

An apparatus for securing cargo to a vehicle, and to tie-downs or sliders receivable in rails mounted to a bed, load deck, or other storage area of a vehicle, such as a pickup, sport utility vehicle, or trailer is described. A user may easily change, adjust or customize the tie-down locations to suit a desired application. The cargo securing system has a rail with a generally C-shaped cross section, the open end of the C-shape defining a slot which may run along the entire length of the rail. The C-shaped rail also defines a channel which may run along the entire length of the rail. A slider member may reside in the channel and include a foot or base portion and an integral elongate portion which may protrude through the slot in the rail. The slider member may include an integral tie-down location on the elongate portion.

14 Claims, 5 Drawing Sheets

ADJUSTABLE CARGO SECURING SYSTEM

CROSS-REFERENCE TO RELATED APPLICATION

This application claims the benefit of priority to U.S. provisional patent application Ser. No. 61/155,645, filed on Feb. 26, 2009, the disclosure of which is incorporated herein by reference.

FIELD OF THE INVENTION

The present invention relates generally to the field of securing cargo using a rail system, and more particularly to tie-down devices for securing cargo in a truck, trailer, or other vehicle.

BACKGROUND OF THE INVENTION

Vehicles are often used to carry cargo, for example, in a bed or on a load deck of a pickup truck, sport utility vehicle, trailer, or other vehicle. In order to secure the cargo to the load deck, it is common to wrap tie-lines around or over the cargo and to connect the ends of the tie-lines to preexisting holes in the body of the pickup truck or to fixed tie-downs on the body of the pickup truck. The tie-lines can be in the form of wires, straps and/or ropes made of either inelastic or elastic material. As shown in U.S. Pat. No. 5,259,711 to Beck and in U.S. Pat. No. 4,248,558 to Lechner, the tie-downs are generally rings or hooks for receiving the tie-lines and are separate pieces joined to one or more other pieces to form the slider. Furthermore, many pickup trucks are constructed with few or no exposed tie-downs in the load deck, making the use of tie-lines difficult if not impossible. Often, if a pickup truck does have tie-downs, the locations of the tie-downs are limited in number, can not be adjusted, or can be adjusted only to predetermined positions which may not be ideal. This makes it difficult or impossible to properly secure the cargo.

In order to provide tie-down locations for a load deck, track or rail systems have been proposed. Rail systems may include tie-downs in the form of sliders that move along the rail. Often, mechanical latches are used to secure the sliders at desired locations. U.S. Pat. No. 4,969,784 to Yanke shows an anchoring means 30 with a lock means (nut) 34 which is tightened to secure the slider against the track. Such lock means, however, may require tools or special handling, thereby complicating and delaying adjustment of the sliders. Other means of securing the sliders to the rail are known. For example, U.S. Pat. No. 4,248,558 to Lechner shows gripping means 32, 34 in the form of wedge-like teeth which protrude into channels formed in the base of the slider. These teeth are designed for "jamming or gripping engagement" flanges of the rail. Lechner has the disadvantages that the tie-down is constructed from a plurality of parts and may be difficult to produce and assemble. Another example is shown in Beck (U.S. Pat. No. 5,409,335), which uses a spring-biased plunger mechanism to engage the slider with the rail. The prior art lock means are complicated and contain many parts, which may be difficult to manufacture or adjust during use. Consequently, there is a need for a cargo securing system that is simple, inexpensive to manufacture, and easy to adjust.

SUMMARY OF THE INVENTION

The present invention is directed to an apparatus for securing cargo to a vehicle, and more particularly to tie-downs or sliders receivable in tracks or rails mounted to a bed, load deck, or other storage area of a vehicle, such as a pickup, sport utility vehicle, or trailer. A method for securing cargo is also disclosed. For purposes of illustrating the invention, an embodiment of the invention will be described, but the invention is not limited to that embodiment.

The adjustable cargo securing system of the present invention allows a user to easily change, adjust or customize tie-down locations to suit a desired application. The cargo securing system may include an elongated hollow rail having a generally C-shaped cross section. As such, the C-shape defines a slot which may run along the entire length of the rail. The C-shaped rail also defines a channel which may run along the entire length of the rail. The rail may be secured to a vehicle with bolts. A slider member may reside in and engage the channel. The slider may be formed as a unitary piece. The slider may have a foot or base portion having a beveled top surface extending to an elongate portion. The elongate portion may protrude through the slot in the rail. The slider member may include an integral tie-down location on the elongate portion. The slider member may be selectively slidably adjusted to a desired position along the rail.

According to the present invention, a method of securing cargo to a load deck of a vehicle may be accomplished by providing an elongated hollow rail secured to the load deck of the vehicle with bolts. The rail may have a generally C-shaped cross section which defines a channel running along the entire length of the rail. The C-shape may also define a slot in an upper surface of the channel. A slider member may be provided. The slider member may have a foot or base portion having a beveled top surface extending to an elongate portion. The base portion may reside within the channel, while the elongate portion may protrude through the slot in the rail. The slider member may include an integral tie-down location on the elongate portion. The slider member may then be selectively slidably adjusted by a user to a desired position along the rail. The user may engage a tie-line to the cargo and secure the tie-line to the tie-down location of the slider.

BRIEF DESCRIPTION OF THE DRAWINGS

In the drawings, like reference numerals are used throughout to indicate the same or like elements of the invention in which.

DETAILED DESCRIPTION OF THE INVENTION

Figure 1:
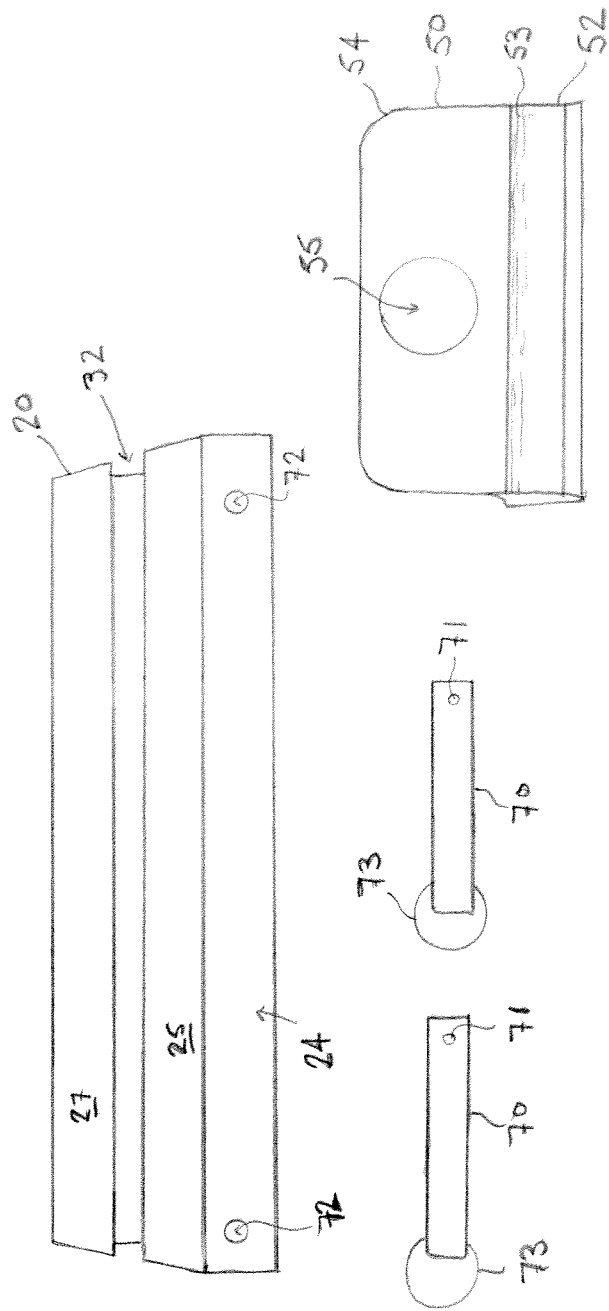
FIG. 1 is a perspective view of components of the cargo securing system according to the present invention.

The present invention is an adjustable cargo securing system 10 for securing cargo that is resting on the load deck (or bed) of a vehicle, such as a pickup truck. FIG. 1 shows components of the cargo securing system 10, which include one or more rails or rail segments 20, one or more sliders 50, and one or more keeper pins 70. The adjustable cargo securing system 10 may be installed on the pickup truck by the manufacturer, or the cargo securing system 10 may be installed as an after-market item, which can be added to the pickup truck after the truck is sold.

Figure 2:
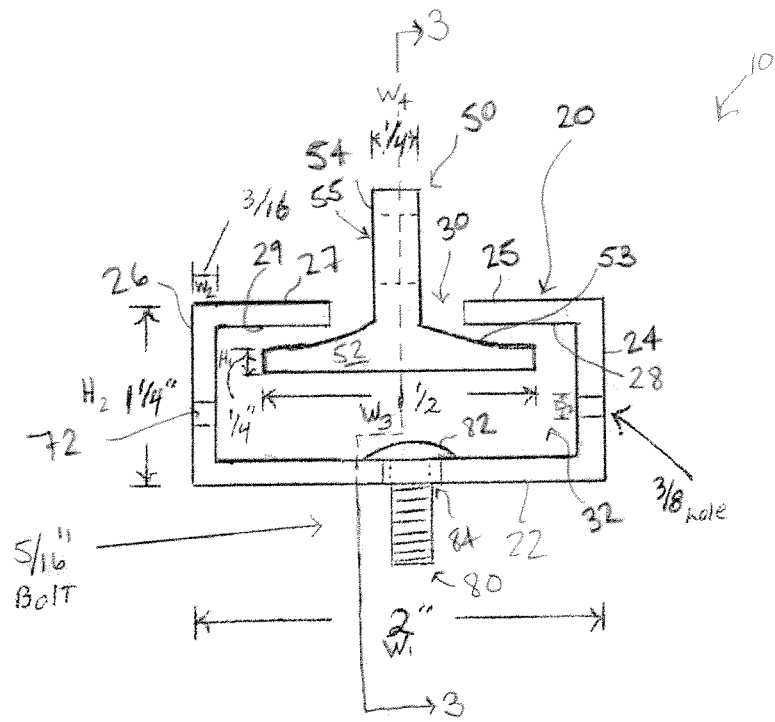
FIG. 2 is an end view of a cargo securing system in accordance with the present invention.

FIG. 2 is an end view of the adjustable cargo securing system 10. The system 10 may include one or more rails or rail segments 20. The rail 20 may include a base portion 22 from which a pair of opposing side walls 24, 26 may extend at substantially right angles to the base 22. A pair of lap walls 25, 27 may extend inwardly from the opposing side walls 24, 26 at substantially right angles to the side walls 24, 26, but ending spaced apart, thereby defining a slot 30. The slot 30 may run along the entire length of the rail 20. The base portion 22, the opposing side walls 24, 26, and the pair of lap walls 25, 27, define a channel 32, which may run the entire length of the rail 20. The channel 32 is best seen in FIG. 2.

Figure 3:
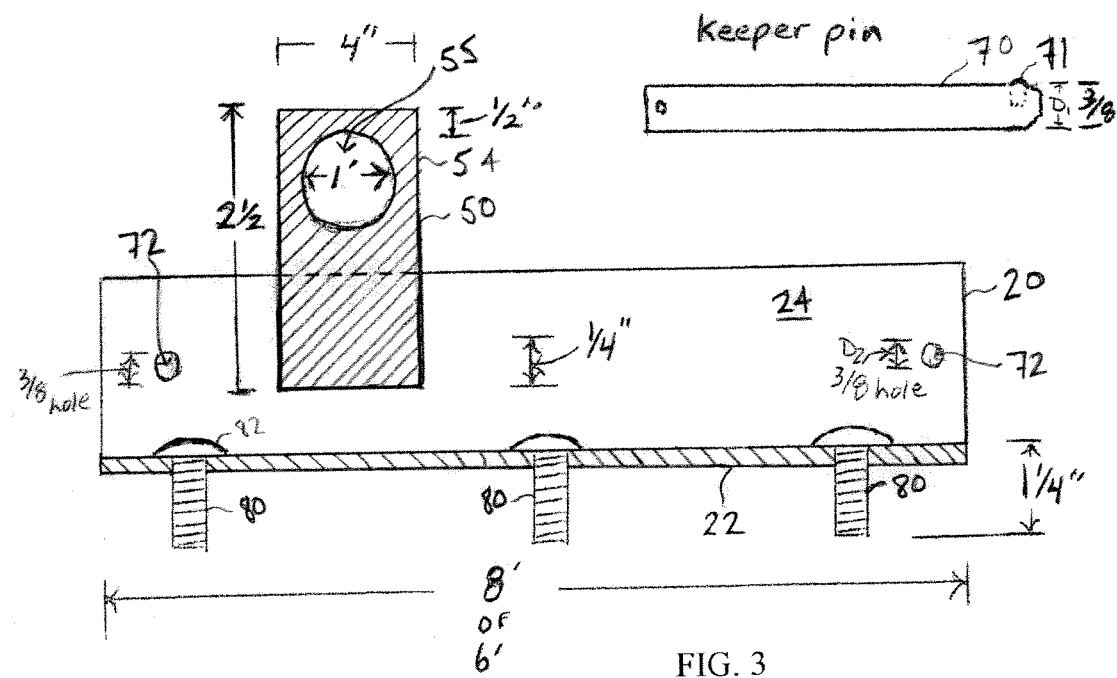
FIG. 3 is a cross-sectional side view of the cargo securing system taken along line 3 of FIG. 2.
Figure 4:
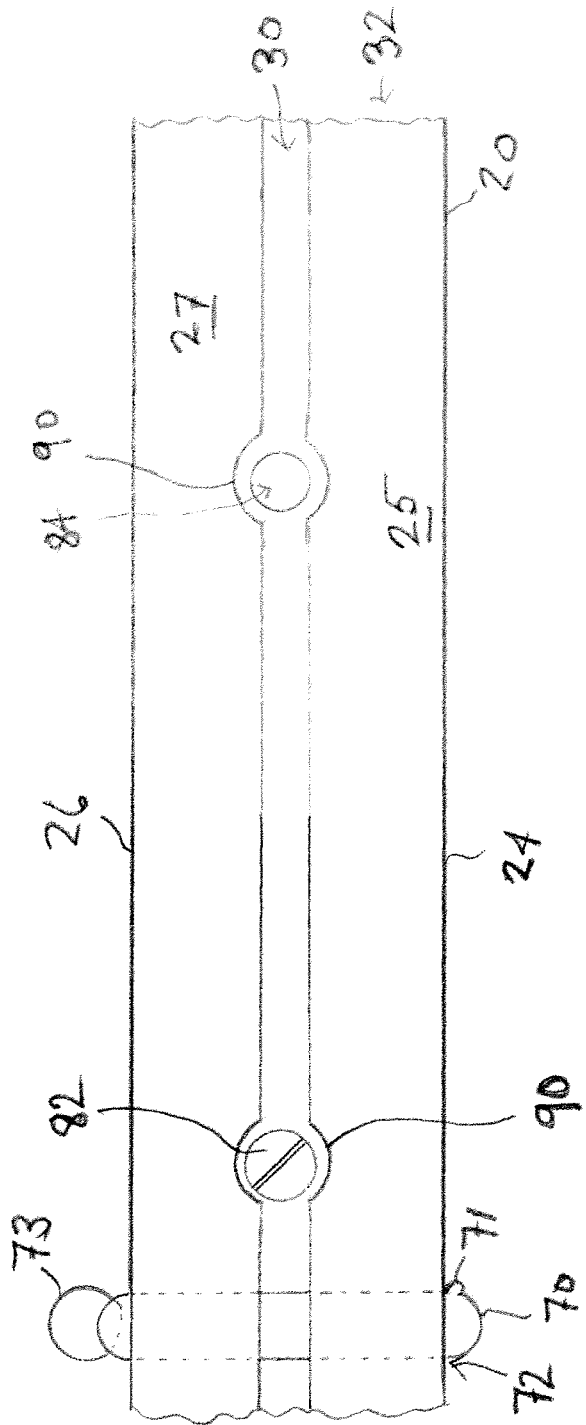
FIG. 4 is a top view of the cargo securing system of FIG. 2.

One or more sliders 50 may reside in the channel 32. The slider 50 may include a base portion 52 and an elongate portion 54. As best seen in FIG. 2, the base portion 52 may be sized to remain in the channel 32 when the system is in use. The elongate portion 54, which may be integrally formed with the base portion 52, may protrude through the slot 30 in the rail 20. FIG. 3 shows that the elongate portion 54 may include an eyelet 55 which is used as a tie-down location in the cargo securing system 10. One or more keeper pins 70 may be inserted into holes 72, which may be located in the ends of the rails 20, in order to prevent the sliders 50 from leaving the channel 32 when the sliders 50 are not in use in securing cargo to a pickup truck bed. The keeper pins 70 may have a protrusion 71 at one end and a removable ring 73 at the opposing end. The keeper pin 70 may be inserted into the holes 72 so that the protrusion 71 lies outside one of the side walls 24, 26 of the rail 20 and the ring 73 may be installed through a hole in the pin 70 so that the ring 73 lies outside the opposing side wall 24, 26, as shown in FIG. 4. This arrangement prevents the sliders 50 from leaving the channel 32. The keeper pins 70 may be removed by the user in order to remove one or more sliders 50 from the rail 20, or to allow the addition of more sliders 50 into the rail 20. Alternatively, in lieu of a keeper pin, other abutments may be used.

FIG. 2 shows that the base portion 52 of the slider 50 may have a beveled top surface 53 extending to the elongate portion 54. The beveled top surface 53 of the slider 50 does not include teeth or notches. In use, when tie-lines are secured to the slider 50, tension is applied to the slider 50 and the tension is transferred to the rail 20 by contact between the smooth top surface 53 of the slider 50 and the inside surfaces 28, 29 of the lap walls 25, 27 of the rail 20. The beveled top surface 53 of the slider 50 helps to securely tighten, or wedge, the slider 50 against the rail 20. The beveled top surface 53 of the slider 50 also helps to center the elongate portion 54 of the slider 50 in the slot 30, thereby transferring tension forces more equally to each of the lap walls 25, 27 of the rail 20.

Figure 5:
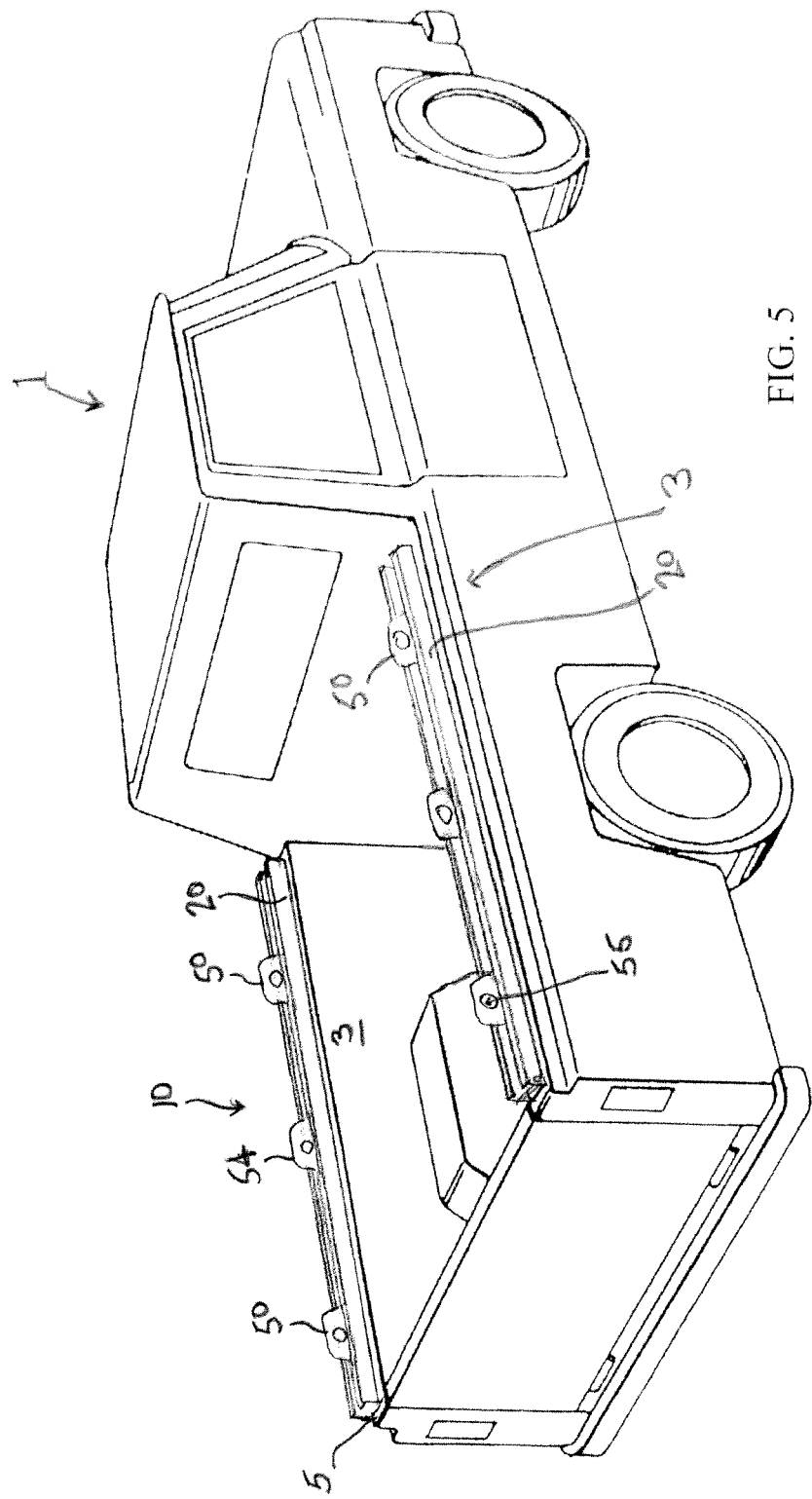
FIG. 5 is a perspective view of the cargo securing system of FIG. 2 shown in use on a pickup truck.
Figure 6:
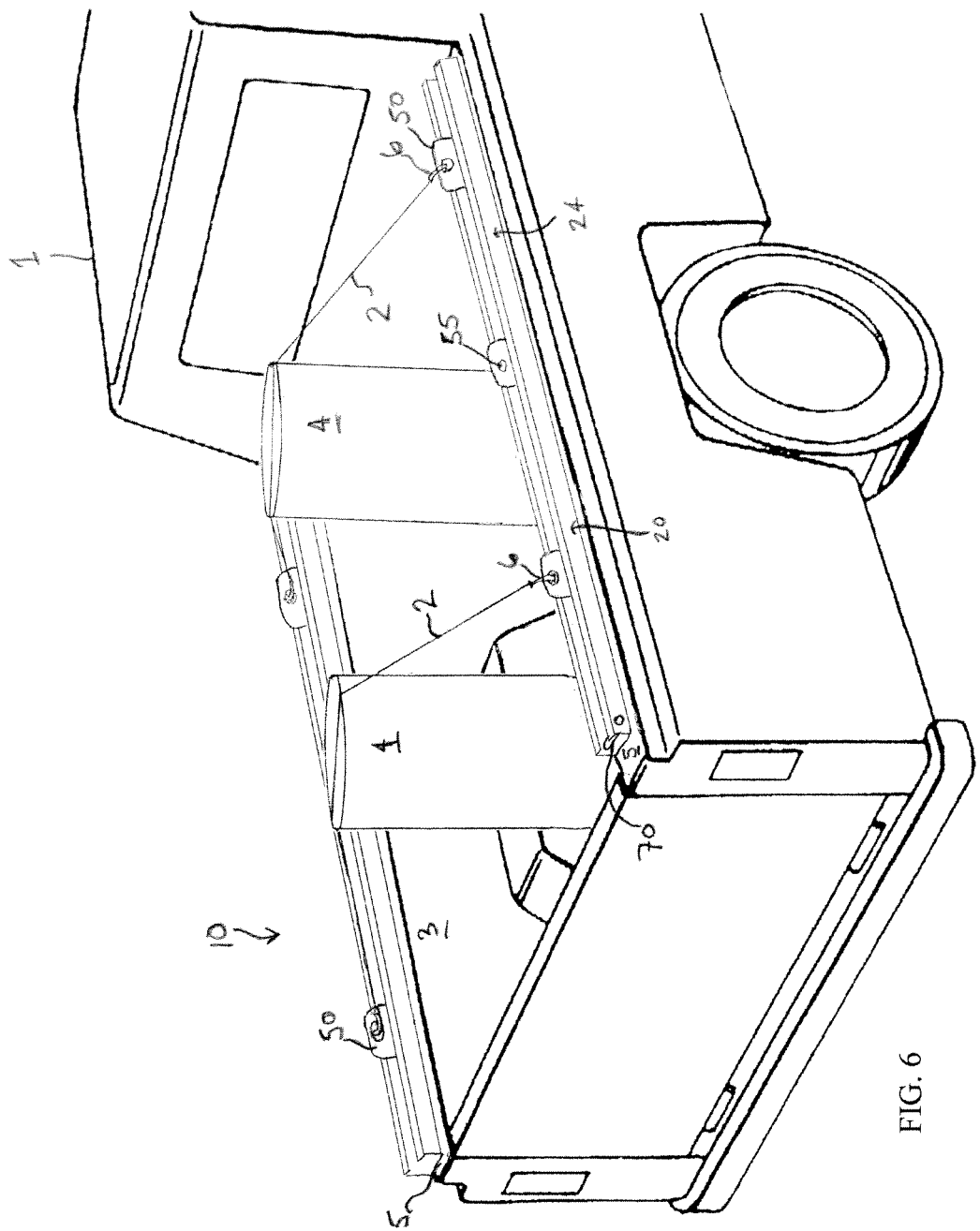
FIG. 6 is a perspective view of the pickup truck of FIG. 5 showing how cargo may be secured with the inventive cargo securing system.

For example, the present invention may be used with a pickup truck 1. FIGS. 5 and 6 show this arrangement. FIG. 5 shows that a pair of rails 20 may be sized to fit and may be installed along a top portion 5 of each of the side walls 3 of a standard the pickup truck 1. The rails 20 may be preferably constructed of aluminum, but steel or other suitable material may also be used. The rails 20 may be constructed in one continuous length, or may be constructed in segments which may be installed end to end onto the top portion 5 of each of the side walls 3 of the pickup truck 1. The rails 20 may be secured to the pickup truck side walls 3 by conventional means, such as with bolts 80. FIG. 4 shows that the rails 20 may include indentations 90 in the lap walls 25, 27 through which the bolts 80 may be accessed. The indentations 90 make the slot wide enough at the locations of the indentations 90 to accommodate a tool, such as a screwdriver, socket wrench or other tool, to allow the user to engage the bolts 80. The bolts 80 may be inserted through the indentations 90 and through the holes 84 in the base portion 22 of the rail and thereby be secured to the side walls 3 of the pickup truck 1. The head 82 of the bolt 80 may protrude into the channel 32 of the rail 20, as best seen in FIGS. 2 and 3. The head 82 of one or more bolts 80 may be countersunk into the base portion 22 in order to minimize or eliminate the extent to which the head 82 protrudes into the channel 32.

For example, specific dimensions of an embodiment of the rail 20 and slider 50 are shown in FIGS. 2 and 3. It should be noticed that the base portion 52 of the slider 50 may be sized for a fairly close, but loose fitting arrangement with channel 32 defined in the rail 20. For example, the total width $W_1$ of the rail 20 may be 2 inches, the width $W_2$ of the opposing side walls 24, 26 may each be 3/16 inches, and the width $W_3$ of the base portion 52 of the slider 50 may be 1½ inches, thereby allowing a close but loose fit of the slider 50 in the channel 32. In this way, the slider 50 may be easily slidably adjusted along the channel 2 by the user without special tools to a desired location.

By example, the base portion 52 of the slider 50 may have a height $H_1$ of ¼ inch which is sized to fit within the channel 32 defined in the rail 20. The height $H_2$ of the rail 20 may be 1¼ inches. The elongate portion 54 of the slider 50 may have a width $W_4$ of ¼ inch which allows the elongate portion 54 to fit in the slot 30 in the rail 20.

Because the beveled top surface 53 of the slider 50 does not include teeth, a user may be able to align the slider 50 at any desired position along the rail 20. Adjustment of the slider 50 may be effected quickly and conveniently by manual manipulation of the slider 50 to a location desired for tying down of cargo in a particular application.

The keeper pins 70, which may have a diameter $D_1$ of 3/8 inch, may be inserted into holes 72 located in the ends of the rails 20 in order to prevent the sliders 50 from leaving the channel 32 when the sliders 50 are not in use. The holes 72 may have a diameter $D_2$ of 3/8 inch.

Returning to FIG. 6, the adjustable cargo securing system 10 is shown in use with a standard pickup truck 1. One or more sliders 50 may typically be carried on each rail 20, the sliders 50 being arranged on the same rail or on different rails, including being on opposing side walls 3 of the pickup truck 1. Tie-lines 2 may be routed around, over, or adjacent to the cargo 4 from one slider 50 to another, and connected to the slider 50 to hold the cargo 4 relative to the bed of the pickup truck 1. The ends of the tie-lines 2 may be looped through the eyelet 55 of the slider 50 and tied, in order to secure the tie-lines 2 relative to the pickup truck bed. FIG. 6 shows that the eyelet 55 may also readily accommodate and hold a metal hook 6 commonly provided at the ends of many tie-lines 2.

In use, when cargo 4 is secured using the cargo securing system 10, the tie-lines 2 are engaged with the sliders 50 and the tie-lines 2 are drawn taught. In so doing, tension is thereby applied to the sliders 50 so that the beveled top surface 53 of the base portion 52 of the slider 50 is brought into contact with the inside surfaces 28, 29 of the lap walls 25, 27, and the location of the slider 50 is thereby held relative to the rail 20 by friction forces.

In contrast to the prior art, the present invention may be simple to manufacture and easy to use. The manually adjustable slider 50 of the present invention may be made from one piece of material, or several pieces welded together to form a unitary body, having a base portion 52 with a beveled top surface 53 that extends to an elongate portion 54. The elongate portion 54 may include an integral tie-down location 55. This is unlike known sliders which may comprise many parts, such as those disclosed in Lechner (U.S. Pat. No. 4,248,558) and Beck (U.S. Pat. No. 5,409,335). Neither of these known sliders has a base portion with a beveled top surface nor a tie-down location that is integral with the elongate portion of the slider.

These, and other prior art sliders also may be difficult and expensive to manufacture, and also may be difficult or impossible for the user to operate manually. The present invention also does not include teeth as disclosed in Lechner (U.S. Pat. No. 4,248,558). Because the beveled top surface 53 of the slider 50 of the present invention does not include teeth, a user may be able to align the slider 50 at any desired position along the rail 20. Unlike Beck, the present invention does not use a spring to bias the slider against the rail. Rather, the beveled top surface 53 of the slider 50 of the present invention is held by friction forces against the rail 20 when the sliders 50 are used to secure cargo 4. The slider of the present invention is a simple device which may be constructed from one piece having a base with an integral elongate portion and tie-down incorporated into the elongate portion.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. An adjustable cargo securing system for a pickup truck, comprising:
    an elongated rail defining a channel and having a generally C-shaped cross section formed by a base portion, opposing side walls and a pair of lap walls, the rail having a first end and a second end, and having a hole extending through a portion of the rail adjacent the first end, the rail having a slot defined in an upper surface of the channel, the slot being bounded by the lap walls;
    a slider in engagement with the channel, the slider including a base portion having a beveled top surface engaging a lower surface of each lap wall, and including an elongate member integrally formed with the base portion, the elongate member protruding through the slot and the elongate member also including an integral tie-down member;
    a keeper pin sized to fit the hole, the keeper pin being configured to prevent the slider from leaving the channel;
    wherein the slot extends from the first end to the second end, the slot being open at the first end and second end;
    wherein the beveled top surface is configured to produce frictional force against the upper surface such that the slider is held relative to the rail.

2. The adjustable cargo securing system of claim 1, wherein the slider is slidably mounted in the channel.

3. The adjustable cargo securing system of claim 1, wherein the base portion of the slider resides within the channel.

4. The adjustable cargo securing system of claim 1, further including bolts to secure the rail to the pickup truck.

5. A pickup truck having an adjustable cargo securing system comprising:
    a pickup truck;
    an elongated rail secured to the pickup truck, the rail having a channel and having a generally C-shaped cross section formed by a base portion, opposing side walls and a pair of lap walls, the rail having a first end and a second end, and having a hole extending through a portion of the rail adjacent the first end, and a slot defined in an upper surface of the channel, the slot being bounded by the lap walls;
    a slider in engagement with the channel, the slider including a base portion having a beveled top surface engaging a lower surface of each lap wall, and including an elongate member integrally formed with the base portion, the elongate member protruding through the slot and the elongate member also including an integral tie-down member;
    a keeper pin sized to fit in the hole, the keeper pin being configured to prevent the slider from leaving the channel;
    wherein the slot extends from the first end to the second end, the slot being open at the first end and second end;
    wherein the beveled top surface is configured to produce frictional force against the upper surface such that the slider is held relative to the rail.

6. The pickup truck of claim 5, wherein the slider is slidably mounted in the channel.

7. The pickup truck of claim 5, wherein the base portion of the slider resides within the channel.

8. The pickup truck of claim 5, further including bolts to secure the rail to the pickup truck.

9. A method of securing cargo to a pickup truck comprising the steps of:
    providing an elongated rail secured to the pickup truck, the rail having a channel and having a generally C-shaped cross section formed by a base portion, opposing side walls and a pair of lap walls, the rail having a first end and a second end, and having a hole extending through a portion of the rail adjacent the first end, and a slot defined in an upper surface of the channel, the slot being bounded by the lap walls;
    providing a slider in engagement with the channel, the slider including a base portion having a beveled top surface engaging a lower surface of each lap wall, and including an elongate member integrally formed with the base portion, the elongate member protruding through the slot and the elongate member also including an integral tie-down member;
    providing a keeper pin sized to fit in the hole, the keeper pin being configured to prevent the slider from leaving the channel;
    engaging a tie-line to the cargo and securing the tie-line to the tie-down member of the slider;
    wherein the slot extends from the first end to the second end, the slot being open at the first end and second end;
    wherein the beveled top surface is configured to produce frictional force against the upper surface such that the slider is held relative to the rail.

10. The method of claim 9, wherein the slider is slidably mounted in the channel.

11. The method of claim 9, wherein the base portion of the slider resides within the channel.

12. The adjustable cargo securing system of claim 1, wherein the rail is configured to be secured to side walls of the pickup truck.

13. The adjustable cargo securing system of claim 5, wherein the rail is configured to be secured to side walls of the pickup truck.

14. The adjustable cargo securing system of claim 9, wherein the rail is configured to be secured to side walls of the pickup truck.

* * * * *